United States Patent
Czermak et al.

[11] Patent Number: 6,113,787
[45] Date of Patent: Sep. 5, 2000

[54] PROCESS AND DEVICE FOR TREATMENT OF WATER FROM A BIODEGRADEABLE PROCESS

[75] Inventors: Peter Czermak, Wetzlar; Heiko Bender, Wölfersheim, both of Germany

[73] Assignee: Herhof Umwelttechnik GmbH, Solms-Niederbiel, Germany

[21] Appl. No.: 08/973,803

[22] PCT Filed: Apr. 9, 1997

[86] PCT No.: PCT/EP97/01754

§ 371 Date: May 1, 1998

§ 102(e) Date: May 1, 1998

[87] PCT Pub. No.: WO97/37942

PCT Pub. Date: Oct. 16, 1997

[30] Foreign Application Priority Data

Apr. 10, 1996 [DE] Germany .......................... 196 14 214

[51] Int. Cl.$^7$ ................................. C02F 3/30; C02F 1/72
[52] U.S. Cl. .......................... 210/605; 210/621; 210/630; 210/631; 210/195.2; 210/202; 210/257.2
[58] Field of Search .................................. 210/605, 610, 210/621, 630, 631, 195.1, 195.2, 196, 202, 257.2, 258, 259

[56] References Cited

U.S. PATENT DOCUMENTS

| | | | |
|---|---|---|---|
| 3,824,185 | 7/1974 | Caldwell et al. | 210/610 |
| 4,160,724 | 7/1979 | Laughton | 210/605 |
| 4,655,925 | 4/1987 | Tabata et al. | 210/605 |
| 4,812,237 | 3/1989 | Cawley et al. | 210/631 |
| 4,824,563 | 4/1989 | Iwahori et al. | 210/605 |
| 5,039,416 | 8/1991 | Loew et al. | 210/631 |
| 5,134,078 | 7/1992 | Sieksmeyer et al. | 210/605 |
| 5,228,995 | 7/1993 | Stover | 210/610 |
| 5,536,407 | 7/1996 | Petersen | 210/605 |
| 5,605,629 | 2/1997 | Rogalla | 210/605 |
| 5,746,920 | 5/1998 | Boergardts et al. | 210/631 |
| 5,910,249 | 6/1999 | Kopp et al. | 210/631 |

FOREIGN PATENT DOCUMENTS

| | | |
|---|---|---|
| 0238148 | 9/1987 | European Pat. Off. . |
| 0297417 | 1/1989 | European Pat. Off. . |

OTHER PUBLICATIONS

Patent Abstracts of Japan vol. 9, No. 222 (C–302), Sep. 9, 1985 & JP 60 082191A, May 10, 1985.
Patent Abstracts of Japan vol. 12, No. 270 (C–515), Jul. 27, 1988 & JP 63 051993A, Mar. 5, 1988.
Patent Abstracts of Japan vol. 10, No. 214 (C–362), Jul. 25, 1986 & JP 61 054295, Mar. 18, 1986.
Patent Abstracts of Japan, vol. 18, No. 233 (C–1195), Apr. 28, 1994 & JP 06 023390, Feb. 1, 1994.
Patent Abstracts of Japan, vol. 95, No. 2, Mar. 31, 1995 & JP 06 328099, Nov. 29, 1994.
Patent Abstracts of Japan, vol. 12, No. 299 (C–520), Aug. 15, 1988 & JP 63 069598, Mar. 29, 1988.
Patent Abstracts of Japan, vol. 13, No. 137, Apr. 5, 1989 & JP 63 302996, Dec. 9, 1988.
Patent Abstracts of Japan, vol. 96, No. 7, Jul. 31, 1996 & JP 08 080499, Mar. 26, 1996.

*Primary Examiner*—Christopher Upton
*Attorney, Agent, or Firm*—Dilworth & Barrese

[57] ABSTRACT

A method serves to treat water, in particular condensate and/or seepage water from a biological degradation process. To simplify and improve such a method, the water is alternately put into aerobic and anaerobic states.

13 Claims, 1 Drawing Sheet

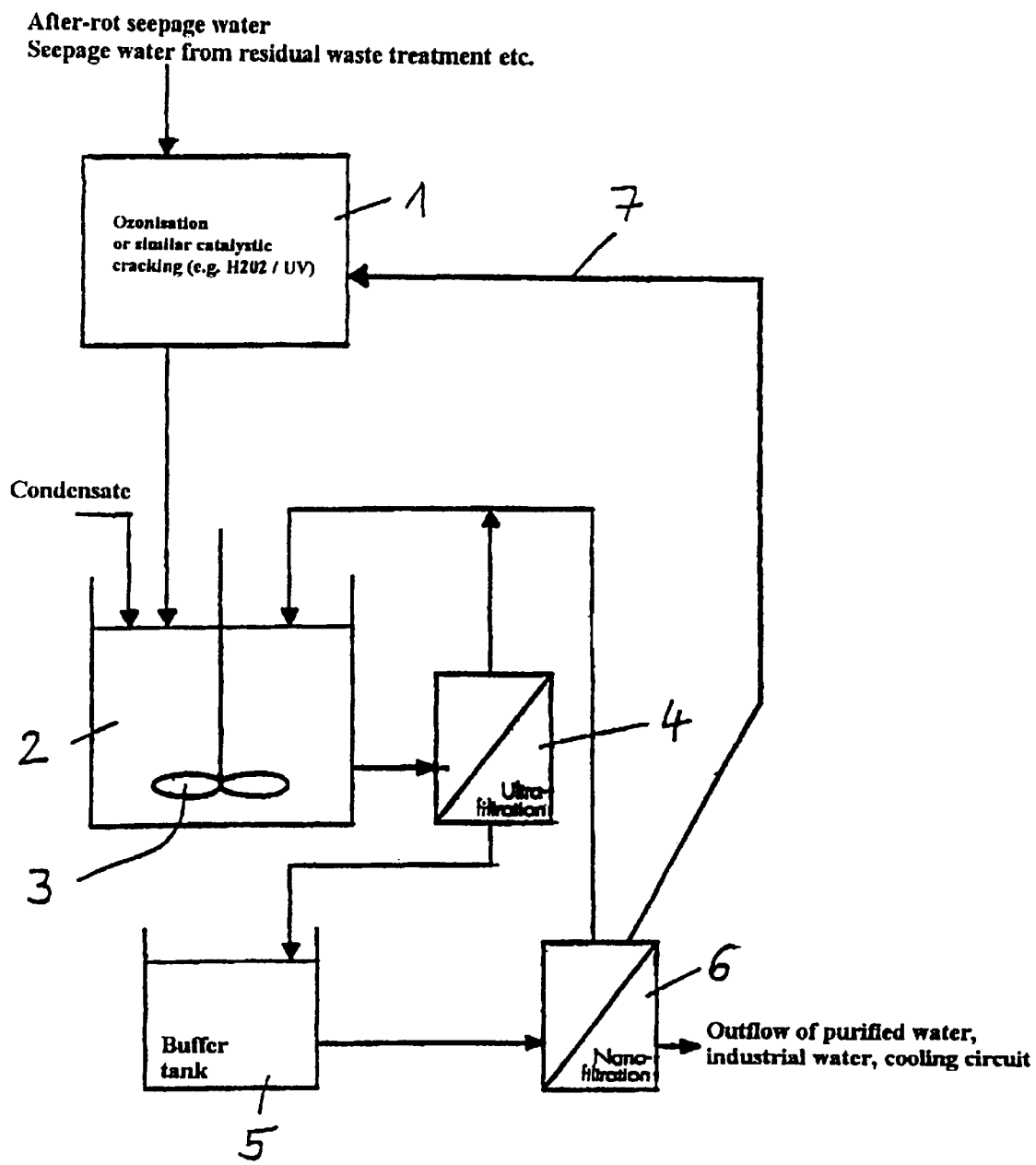

PROCESS AND DEVICE FOR TREATMENT OF WATER FROM A BIODEGRADEABLE PROCESS

BACKGROUND OF THE INVENTION

The invention relates to a method for the preparation of water, in particular of condensate and/or seepage water, from a biological degradation process, and to an apparatus for the performance of such a process.

The biological degradation process can be performed in a closed and/or open fermentation system. In particular, it is a composting, preferably a composting of waste or waste materials containing organic constituents. The composting may be performed in a closed container with induced ventilation. The biological degradation process may be a biological stabilization process in which materials, particularly waste, are biologically stabilized in a closed container with induced ventilation. The biological degradation process may, however, also be the rotting process of an after-rotting clamp.

A method is known from DE-OS 44 12 890 to purify water, in particular condensate from a composting process, in which the water is purified in a bioreactor. The condensate from the composting process is first subjected to biological purification by an oxygen feed in a high-performance biology. Subsequently, the newly created biomass and the permeate are separated by ultrafiltration of the water held in the circuit. However, in certain application cases, this procedure can lead to the permeate from the seepage water being laden with a relatively high COD contamination and taking a relatively high nitrogen freight along with it. Furthermore, in the known prior method, a certain effort for the measuring technology is required.

The object of the invention is to simplify and improve a method of the type first given.

SUMMARY OF THE INVENTION

This object is solved in accordance with the invention by the water being alternately put into aerobic and anaerobic states. In this way, noxious materials, in particular compounds of nitrogen, are simply and effectively degraded.

In accordance with the invention, the metabolic products, in particular the condensable metabolic products released in the biological degradation process as a consequence of the biological metabolism are eliminated from the off-gas flow of the biological degradation process in particular by condensation. The metabolic products are fed to a water treatment plant in which the water is alternately put into aerobic and anaerobic states. The special feature of the metabolic products or of the condensable metabolic products (condensation products) comprises compounds of nitrogen being liberated due to the high heat content of the biologically formed water and as a consequence of the $CO_2$ with the varying pH dissolved in it which must be prepared in an environmentally neutral manner. This is achieved in accordance with the invention by the biological purification being performed in an oxically/anoxically intermittent operation with nitrogen being released elementally by nitrification and denitrification and being able to be lead into the atmosphere.

Advantageous embodiments are described herein.

It is advantageous if first compounds in the water which are difficult to degrade are destroyed by catalytic cracking or an oxidation process and if subsequently the water is alternately put into aerobic and anaerobic states. The catalytic cracking or oxidation process can be done by ozonization. However, other measures are also possible such as treatment with $H_2O_2$ (hydrogen peroxide) and/or radiation with UV rays.

It is advantageous to have a subsequent ultrafiltration and/or nano-filtration. The water is thus preferably ultrafiltered or nano-filtered after it has been put into aerobic and anaerobic states. Thanks to the ultrafiltration, the constituents contaminating the permeate causing COD and BOD can again be fed to the "biology", that is the reaction tank in which the water is alternately put into aerobic and anaerobic states. By means of a nano-filtration situated after the ultrafiltration, this effect can be achieved even more intensively. Thanks to the return of the permeate constituents, the pollutants remain longer in the biological degradation area. Furthermore, in this way the nutrients contained in the permeate are returned to the reaction tank in which the water is alternately put into aerobic and anaerobic states.

With the ultrafiltration, the long-chain carbon compounds and hydrocarbon compounds which are difficult to degrade are not fully filtered out. However, these compounds are necessary as carbon sources for the degradation of the compounds of nitrogen. They are filtered out or collected by the nano-filtration and returned.

To compensate for any nutrients which may be lacking, such nutrients can according to another advantageous embodiment be fed in doses from the outside to the "biology", that is the reaction tank in which the water is alternately put into aerobic and anaerobic states, for example phosphate, carbon sources and/or other suitable wastes as carbon sources.

In a liquid low in nutrients such as condensate from the off-air of a rotting process, a microbial degradation of ammonium can only be achieved by adding nutrients not contained in this liquid which build up bio-cell mass. This is done, as described above, through the return of the permeate constituents and/or by supply from the outside.

As there may be differences in performance between the ultrafiltration and nano-filtration flow rate, in accordance with another advantageous embodiment a buffer tank can be provided between these two stages in which the water is placed after ultrafiltration and before nano-filtration.

Another advantageous embodiment is characterized in that the compounds contained in the retent which by the degradation process are difficult to degrade are destroyed by catalytic cracking or oxidation process and subsequently added to the process in which the water is alternately put into aerobic and anaerobic states. As already described above, the nano-filtration collects the long-chain carbon compounds and hydrocarbon compounds which are difficult to degrade by the degradation process not completely filtered out by the ultrafiltration. To ensure that these compounds are available in even better form and even more effectively for the degradation of noxious materials, in particular of the compounds of nitrogen. they are first destroyed or cracked by catalytic cracking or oxidation process and subsequently fed to the degradation process.

The object forming the basis of the invention is solved in an apparatus to perform the method in accordance with the invention by a reaction tank in which the water can alternately be put into aerobic and anaerobic states. Preferably, there is an apparatus in the apparatus in accordance with the invention for the destruction of compounds which are difficult to degrade by the biological degradation process by catalytic cracking or oxidation process. The apparatus in accordance with the invention is further preferably characterized by an ultrafilter and/or a nano-filter and/or a buffer tank provided between the ultrafilter(s) and the nano-filter (s). Preferably, a line leads from the nano-filter to the apparatus for the destruction by catalytic cracking or oxidation process of compounds which are difficult to degrade by the degradation process. The retent separated during nano-filtration is fed to the apparatus for catalytic cracking through this line.

BRIEF DESCRIPTION OF THE DRAWING

One embodiment of the invention is explained in detail below by means of the attached drawing. In the drawing the only FIGURE shows a schematic representation oif a water treatment plant to perform the method in accordance with the invention.

DESCRIPTION OF THE PREFERRED EMBODIMENT

The water treatment plant shown schematically in the only FIGURE possesses an apparatus 1 for the destruction of compounds which are difficult to degrade by catalytic cracking or oxidation process, for example by ozonization or $H_2O_2$ treatment or by UV radiation. The after-rot seepage water from a biological degradation process and/or the seepage water from a treatment of residual waste is supplied to the apparatus 1.

The water treated by the apparatus 1 is subsequently fed into a reaction tank 2 in which the water is alternately put into aerobic and aerobic states. Furthermore, (untreated) condensate, preferably from a biological degradation process, can be introduced into the reaction tank. The reaction tank 2 possesses an agitator 3.

The water treated in the reaction tank 2 is fed from there to an ultrafiter 4. The retent is fed back into the reaction tank 2. The permeate is fed to a butter tank 5 and from there to a nano-filter 6. The permeate of the nano-filter 6 runs off as purified or industrial water. It can furthermore be used for a cooling circuit. The retent of the nano-filter 6 is fed to the reaction tank 2. Instead of or additionally to this the retent of the nano-filter 6 or a portion of it can be fed through the line 7 to the apparatus 1 for the destruction of compounds difficult to degrade by catalytic cracking or oxidation process.

The method in accordance with the invention in particular opens up the possibility of eliminating safely and with a higher degree of efficiency than hitherto organic compounds which are difficult to degrade biologically with the control of purity being able to be done by means of an optical control. With the method in accordance with the invention and the apparatus in accordance with the invention in particular condensates and seepage water from biological waste treatment plants can be treated. As explained by means of the example first compounds which are difficult to degrade are destroyed in the waster water by catalytic cracking or oxidation process (e.g. ozone, $H_2O_2$, UV treatment). Then the water is put alternately into aerobic and anaerobic states to eliminate nitrogen and then subjected to ultrafiltration and subsequently nano-filtration. After an optically controlled separation of the permeate, the nutrients lacking are added to the concentrate or retent fed into the biology. A buffer tank is provided between the ultrafiltration and the nano-filtration by which the different degrees of performance of the two systems are balanced out.

What is claimed is:

1. A method for the treatment of water from a biological degradation process, comprising the steps of
first subjecting compounds in the water difficult to degrade by the biological degradation process to destruction by catalytic cracking or an oxidation process,
then placing the water alternately into aerobic and anaerobic states,
subsequently ultrafiltering the water from the alternate treatment step,
nano-filtering the water after the ultrafiltration step,
separating retent during the ultrafiltration and/or nano-filtration steps and feeding the retent to the step in which the water is alternately placed into the aerobic and anaerobic states, and
feeding compounds contained in the retent from nano-filtration step and which are difficult to degrade by the biological degradation process to the step of subjecting the compounds to destruction by the catalytic cracking or oxidation process and subsequently feeding the same to the step in which the water is alternately placed into the aerobic and anaerobic states.

2. A method in accordance with claim 1, comprising the additional step of introducing the water into a buffer tank after the ultrafiltration and prior to the nano-filtration steps.

3. A method in accordance with 1, comprising the additional step of adding materials to the retent separated during ultrafiltration and/or nano-filtration steps.

4. A method in accordance with claim 3, wherein the materials added to the retent are nutrients.

5. A method in accordance with claim 1, wherein the water being treated is condensate and/or seepage water from the biological degradation process.

6. A method in accordance with claim 1, comprising the additional step of eliminating metabolic products released in the biological degradation process as a consequence of biological metabolism from an off-gas flow from the biological degradation process by condensation and feeding the same to the apparatus for subjecting the compounds in the water to destruction by the catalytic cracking or oxidation process and/or directly to the reaction tank in which water is placed alternatively into the aerobic and anaerobic states.

7. A method in accordance with claim 6, wherein the condensable metabolic products comprising nitrogen compounds being liberated due to high heat content of biologically-formed water and as a consequence of carbon dioxide with varying pH dissolved in the water, are prepared in an environmentally neutral manner by the biological purification being performed in an oxically/anoxically intermittent operation with nitrogen being released elementally by nitrification and being able to be lead to the atmosphere.

8. A method in accordance with claim 1, wherein the step of catalytic cracking or oxidation process comprises at least one of ozonization, hydrogen peroxide treatment, and irradiation with ultra-violet rays.

9. An apparatus to perform a method for the treatment of water from a biological degradation process, comprising
an apparatus arranged to receive the water and subject compounds in the water which are difficult to degrade by the biological degradation process, to destruction by catalytic cracking or an oxidation process,
a reaction tank coupled to said apparatus and arranged downstream thereof, in which the water is placed alternately into aerobic and anaerobic states,
an ultrafilter arranged downstream of said reaction tank,
a nano-filter arranged downstream of said ultrafilter,
a line arranged from said ultrafilter and/or nano-filter to lead to said reaction tank in which the water is placed alternately into the aerobic and anaerobic states for feeding of retent separated during passage through the ultrafilter and/or nano-filter to the reaction tank in which water is alternatively placed into the aerobic and anaerobic states, and a line (7) arranged from the nano-filter (6) to the apparatus (1) for the catalytic cracking or oxidation process, for feeding of compounds difficult to degrade by the biological degradation process to the apparatus (1) and subjecting the compounds to destruction by the catalytic cracking or degradation process, and subsequent feeding to the reaction tank in which the water is alternately placed into the aerobic and anaerobic states.

10. An apparatus in accordance with claim 9 additionally comprising a buffer tank provided between the ultrafilter(s) and the nano-filter(s).

11. An apparatus according to claim 9, additionally comprising means for introducing materials to the retent separated at the ultrafilter and/or nano-filter.

12. An apparatus in accordance with claim 9, wherein said apparatus is arranged to subject the compounds difficult to degrade to destruction by the catalytic cracking or oxidation process, comprises means for conducting at least one of ozonization, treatment with hydrogen peroxide, and irradiation with ultraviolet rays.

13. An apparatus in accordance with claim 9, additionally comprising an agitator arranged in said reaction tank in which the water is placed alternately into the aerobic and anaerobic states.

* * * * *